United States Patent [19]

Powers

[11] 4,438,178
[45] Mar. 20, 1984

[54] ADHESIVE ACTIVATED POLYESTER FIBROUS MATERIAL

[75] Inventor: Edward J. Powers, Louisville, Ky.

[73] Assignee: Fiber Industries, Inc., Charlotte, N.C.

[21] Appl. No.: 437,043

[22] Filed: Oct. 27, 1982

[51] Int. Cl.$^3$ .............. D04H 1/58; B32B 27/34; D02G 3/00

[52] U.S. Cl. ............ 428/289; 428/375; 428/395; 428/483; 427/389.7

[58] Field of Search ........ 428/357, 375, 378, 395, 428/245, 289, 290, 483; 568/649, 676; 560/87; 427/389.7

[56] References Cited

U.S. PATENT DOCUMENTS

| | | | |
|---|---|---|---|
| 2,260,753 | 10/1941 | Marple et al. | 568/649 |
| 3,922,423 | 11/1975 | Hoerster et al. | 427/389.9 |

FOREIGN PATENT DOCUMENTS

| | | | |
|---|---|---|---|
| 208322 | 3/1955 | Australia | 428/289 |
| 964136 | 3/1975 | Canada | 428/375 |

*Primary Examiner*—Marion McCamish
*Assistant Examiner*—Beverly K. Johnson
*Attorney, Agent, or Firm*—S. M. Bodenheimer, Jr.

[57] ABSTRACT

The invention provides a polyester fibrous material for incorporation into rubber bearing an adhesive activator finish comprising as the active ingredient, an epichlorohydrin ether or ester derived from a polyhydric alcohol or polycarboxylic acid containing up to about 20 carbon atoms. Adhesive activated fibers of the invention can obtain a degree of adherence to rubber equal to or closely approaching adherence provided by epoxy adhesive activated polyester fibers.

11 Claims, No Drawings

ADHESIVE ACTIVATED POLYESTER FIBROUS MATERIAL

BACKGROUND OF THE INVENTION

The invention relates to an adhesive activated polyester fibrous material. More specifically, the invention relates to a polyester fibrous material for incorporation into rubber.

Polyester fibers, cords and fabrics are used extensively for reinforcing rubber articles such as tires, belts, hoses and the like. But, polyester textile elements generally adhere poorly to rubber unless first treated to improve adhesion, as by coating. Because of the exceptional strength and reinforcing ability of polyester fibers there has been a continuous effort to improve the adhesion of polyesters to rubber.

A widely used process for adhering polyester to rubber involves coating polyester with an RFL latex which contains a resorcinolformaldehyde resin. The thus coated polyester is heated and then incorporated into rubber. But, the system can be unsatisfactory depending on factors such as the degree of polyester heat treatment; the composition of polyester substrate; the amount of stress and heat the reinforced rubber article undergoes; and the like.

In order to further improve polyester adhesion, polyester fibers are typically coated during spinning with an adhesive activator. In actual commercial practice, such adhesive activators, as a general rule, comprise one or more active epoxy compounds. Notable are compounds such as dimethylol-bisphenol-A-diepoxide, butanediol diglycidic ether, glycerol diglycidyl ether and epoxidized silanes. Such epoxy compounds have been found to greatly increase adhesion of polyester to rubber when used prior the RFL dip.

Nevertheless, an extensive search has been made for different adhesive activating agents for bonding polyester to rubber. An epoxy replacement would be highly desirable because of indications that the epoxies present hazards to humans involved in spinning. Though the search for an epoxy substitute has been ongoing for several years, few compositions capable of matching the performance of epoxies have emerged.

There is therefore a need for an alternative adhesive activating system which can replace the epoxy spin finish while achieving adhesive results substantially the same to the epoxy. Any such candidate should fit into existing fiber producing procedures and be compatible with the RFL dip systems widely used by rubber article manufacturers.

SUMMARY OF THE INVENTION

Following extensive experimentation, a new adhesive activator for polyester fibers has been found. The invention provides a multi-filament polyester fibrous material for incorporation into rubber which bears a finish comprising, as the active ingredient, a composition of the formula: $R-(O-CH_2CHOH-CH_2-Cl)_x$ wherein R represents the residue of a polyhydric alcohol or polycarboxylic acid and contains up to about 20 carbon atoms and x represents a number greater than 1.

In advantageous embodiments of the invention, R represents the residue of a polyhydric alcohol and x preferably has a value of from about 4 to about 9. The composition preferably includes a small amount of a polymerization catalyst. The finish advantageously further includes a polyester fiber lubricant and is advantageously applied during spinning. Crosslinking agents such as aminoplast compositions can be included in the finish.

DETAILED DESCRIPTION OF THE INVENTION

The invention is useful in conjunction with any of various well known multi-filaments polyester fibrous materials including for example, fibers, yarns, cords, fabrics and the like. The term "polyester" is used herein to mean any high polymeric linear ester obtained by heating one or more glycols of the series $HO(CH_2)_nOH$, wherein n is greater than 1 but does not exceed 10, with a dicarboxylic and preferably terephthalic acid or an ester forming derivative thereof. The phrase "high polymeric linear ester" is used herein to mean a polyester which is capable of molecular orientation as shown by characteristic X-ray patterns, by drawing or rolling. Examples of ester forming derivatives of terephthalic acid are aliphatic (including cycloaliphatic) and aryl esters and half-esters, its acid halides and its ammonium and amine salts. Examples of such glycols are ethylene, trimethylene, tetramethylene, hexamethylene and decamethylene glycols. The preferred polymer for purposes of the invention is polyethylene terephthalate.

The active ingredient of the finish according to the invention is a compound having the formula: $R-(O-CH_2-CHOH-CH_2-Cl)_x$ wherein R represents the residue of a polyhydric alcohol or polycarboxylic acid and contains up to about 20 carbon atoms and x represents a number greater than 1. Preparation of the compound is accomplished by reacting a polyhydric alcohol or polycarboxylic acid with epichlorohydrin in the presence of a Lewis acid catalyst by means known to those skilled in the art. Such reaction is described in, for example, U.S. Pat. No. 2,260,753 to Marple et al which is hereby incorporated herein by reference. Said reaction is preferably conducted using a stoichiometric equivalent or excess of the polyhydric alcohol or polycarboxylic acid. This expedient tends to favor the primary combination product between the hydroxy compound and the epichlorohydrin, which product is the chlorohydrin ether or ester while secondary products resulting from reaction of the primary chlorohydrin ether or ester with additional epichlorohydrin are surpressed. Nevertheless, compositions containing such secondary ethers or esters are useful in the invention and within its scope.

Any of various polyhydric alcohols (including phenols and naphthols) can be used to prepare the epichlorohydrin ethers. Exemplary aromatic alcohols include resorcinol, catecol, hydroquinone, methyl resorcinol, 2,2-bis(4-hydroxyphenyl)butane; 4,4 dihydroxyenzophenone; bis(4-hydroxyphenyl)ethane; and 1,5-dihydroxynaphthalene. Exemplary aliphatic polyhydric alcohols include glycerol, propylene glycol, ethylene glycol, diethylene glycol, butylene glycol, hexanetriol, sorbitol, mannitol, glycerol, pentaerythritol, polyallyl alcohol, polyvinyl alcohol, inositol, trimethylolpropane, bis(4-hydroxycyclohexyl)dimethylmethane; 1,4-dimethylolbenzene; 4,4-dimethyloldiphenyl, dimethyltoluenes and the like. The term "polyhydric alcohol" is further intended to include polyhydric alcohols containing other functional moieties such as ether, ester, aldehyde, ketone, silyl and the like. Such compounds include for example, diglycerol, triglycerol, diethylene glycol, polyethylene glycols, dextrose, fructose, and the like.

Any of various polycarboxylic acid (both aliphatic and aromatic) having up to twenty carbon atoms can be used to prepare the epichlorohydrin esters. Exemplary polycarboxylic acids include maleic acid, fumaric acid, itaconic acid, citraconic, glutaconic acid, mesaconic acid, terephthalic acid, naphthalene-2,6-dicarboxylic acid, 4,4 diphenoxydicarboxylic acid and the like. Such acids can include other functional moieties as will be known to those skilled in the art.

The finish can include a polyether crosslinking agent for the chlorohydrin ether or ester. The crosslinking agent can advantageously be an aminoplast such as for example, hexa(methoxymethyl)melamine. When included, the crosslinking agent will advantageously be present in an amount of between about 1 to about 30% by weight, based on the weight of the chlorohydrin ether or ester, more advantageously between about 15% and about 25% by weight, based on the weight of the chlorohydrin ether or ester.

Advantageously, the finish will also include a polymerization catalyst such as will be known to those skilled in the art. For example, when the active ingredient is the chlorohydrin ether or ester, alone, the polymerization catalyst will typically be a basic composition or salt thereof, such as for example sodium carbonate, benzyltrimethylammonium hydroxide or the like. Preferably, such basic polymerization catalyst will be a weak base so that the pot life of the finish will not be detrimentally affected. Where the active composition in the finish of the invention includes a cross-linking agent such as an aminoplast, the polymerization catalyst will advantageously be an acidic polymerization catalyst such as, for example, a Lewis acid catalyst, e.g., phosphoric acid or other acid catalysts known to those skilled in the art. The polymerization catalyst will typically be included in a small amount of between about 0.05% to about 2% by weight, based on the weight of the chlorohydrin ether or ester.

The active composition can be either dissolved in an oily lubricant vehicle or emulsified with water. The lubricant based finish is preferred. Preferably, the finish will contain 5 to 50% by weight, based on the weight of the finish, of the active ingredient, preferably between about 20 to about 30% by weight of active ingredient. Suitable lubricating vechicles will be nonreactive with the chlorohydrin ether or ester and include for example, silicon polymer oils, mineral oils, polyethylene and/or polypropylene oxide polymers and copolymers, palm oil, coconut oil, cottonseed oil and esters of the the predominant fatty acids of said oil, glycerides, butyl stearate, octyl stearate, esters of oleic acid, trimethylol propane/caprylic acid esters, 2-methylpropyl-propanediol-1,3-dilaurate and the like. Antioxidant composition as will be known to those skilled in the art may also be included. When the finish is supplied as an emulsion, it will be recognized that an inert emulsifying agent will be included in the finish.

The finish is applied to the polyester fibrous material by any suitable means, as by spraying, dipping, padding, kiss roll application or the like. Advantageously, the finish is applied to polyester fibers during spinning in a post quench zone prior to drawing. The finish is applied in an amount effective to increase adherence of the polyester fibers to rubber, advantageously in an amount of between about 0.2% and about 2.0% by weight of the fibrous material, more advantageously between about 0.4% and about 0.7%, by weight of the fibrous material. If too much finish is used, finish buildup on rolls and fuming can be encountered. On the other hand if too little finish is used, the fibrous material can be so poorly lubricated that processing becomes overly difficult.

An adhesive RFL coating will be applied to the adhesive activated multifilament polyester fibrous material of the invention prior to its incorporation into rubber. The RFL coating is applied in accordance with conventional techniques known to those skilled in the art of bonding fibrous polyester material to rubber. It will be recognized that the RFL dip can include additives commonly employed by those skilled in the art such as, for example, triallylisocyanaurate, blocked isocyanates, active epoxy compositions, and the like. Following application of the RFL coating, the polyester fibrous material will be heated, and a layer of rubber will be applied to and cured on the thus treated polyester fibrous material. The resultant composite will typically be cured.

Surprisingly, it has been found that adhesive activated fibers of the invention can obtain a degree of adherance to rubber which is equal to or closely approaching the degree of adherance provided by epoxy adhesive activated polyester fibrous materials.

The following examples serves to illustrate the best mode contemplated for carrying out the invention.

EXAMPLE 1

The following finishes were prepared and applied to polyester industrial yarn as a spin finish in a post quench zone prior to drawing:

Finish A 29.6% Sorbitol polychlorohydrin ether
0.4% Benzyl trimethylammonium hydroxide
60.0% Fatty acid ester of a methyl endcapped ethylene oxide/propylene oxide block copolymer lubricant base
10.0% Polyoxyethylene nonylphenol ether Finish B 20.0% Sorbitol polychlorohydrin ether
18.8% Hexa(methoxymethyl)melamine
0.2% Phosphoric acid
50.0% Fatty acid ester of a methyl endcapped ethylene oxide/propylene oxide block copolymer lubricant base
10.0% Polyoxyethylene nonylphenol ether The finishes were applied to the yarn in an amount of about 0.7% based on yarn weight.

A control yarn was prepared at the same time using the same spinning equipment. The finish applied to the control yarn was a commercially utilized active epoxy spin finish applied at the commercially used level.

Samples of each yarn were tested to determine physical properties and results recorded. Then the yarns were topcoated with an oily fatty acid alkyl ester topcoat, twisted into cord and physical properties determined and recorded. The cords were dipped in a conventional RFL latex adhesive, heated and again tested and results recorded. The RFL coated cords were bonded to rubber and tested by standard H-block adhesion tests; peel adhesion after one hour ageing in steam and peel adhesion at 250° F. Results are set forth below, for two different levels of RFL dip pick up.

TABLE 1

|  | CONTROL | FINISH A | FINISH B |
|---|---|---|---|
| RFL Dip Pick Up | 4.5 | 4.5 | 4.2 |
| Yarn |  |  |  |
| Tenacity-(gpd) | 8.87 | 8.75 | 8.97 |
| (%) Elongation | 11.3 | 11.0 | 9.9 |
| Greige Cord |  |  |  |
| Breaking Strength (lbs) | 34.7 | 33.4 | 33.4 |
| Elongation at Break (%) | 16.0 | 14.1 | 14.5 |
| Treated Cord |  |  |  |
| Breaking Strength (lbs.) | 31.7 | 32.3 | 31.1 |
| Elongation at Break (%) | 14.2 | 14.2 | 13.4 |
| Elongation at 10 lbs (%) | 3.5 | 3.5 | 3.7 |
| Stiffness Rating | 100 | 121 | 135 |
| Adhesion |  |  |  |
| ¼ inch H-Block Rating | 100 | 92 | 97 |
| ⅜ inch H-Block Rating | 100 | 90 | 88 |
| Pet Peels |  |  |  |
| One Hr. Steam Aged Adhesion |  |  |  |
| Lbs. | 24 | 26 | 13 |
| Vis. | 2.0 | 2.0 | 1.0 |
| 250° Peel Adhesion |  |  |  |
| Lbs. | 16 | 22 | 8 |
| Vis. | 1.9 | 2.2 | 1.1 |

TABLE 2

|  | CONTROL | FINISH A | FINISH B |
|---|---|---|---|
| RFL Dip Pick Up (%) | 6.2 | 6.4 | 6.3 |
| Yarn |  |  |  |
| Tenacity (gpd) | 8.87 | 8.75 | 8.97 |
| (%) Elongation | 11.3 | 11.0 | 9.9 |
| Greige Cord |  |  |  |
| Breaking Strength | 34.7 | 33.4 | 33.4 |
| Elongation at Break (%) | 16.0 | 14.1 | 14.5 |
| Treated Cord |  |  |  |
| Breaking Strength (lbs) | 31.3 | 31.4 | 30.2 |
| Elongation to Break (%) | 13.9 | 13.2 | 12.8 |
| Elongation at 10 lbs (%) | 3.4% | 3.2 | 3.5 |
| Stiffness Rating | 100 | 117 | 125 |
| Adhesion |  |  |  |
| ¼ inch H-Block Rating | 100 | 88 | 93 |
| ⅜ inch H-Block Rating | 100 | 86 | 95 |
| Pet Peels |  |  |  |
| 1 Hr. Steam Aged Adhesion |  |  |  |
| Lbs. | 46 | 32 | 45 |
| Vis. | 2.8 | 1.8 | 2.5 |
| 250° Peel Adhesion |  |  |  |
| Lbs. | 30 | 22 | 29 |
| Vis. | 3.8 | 2.5 | 3.0 |

It can be seen that adhesion of polyester cord prepared according to the invention approached that obtained with a convention epoxy spin finish with little strength loss.

The invention has been described in considerable detail with specific reference to various preferred embodiments. But variations and modifications can be made without departing from the spirit and scope of the invention as described in the foregoing specification and defined in the appended claims.

What is claimed is:

1. A multi-filament polyester fibrous material for incorporation into rubber which is coated with a finish comprising, as the active ingredient, a composition of the formula: $R-(O-CH_2CHOH-CH_2-Cl)_x$ wherein R represents the residue of a polyhydric alcohol or polycarboxylic acid and contains up to 20 carbon atoms and x represents a number greater than one.

2. The multi-filament polyester fibrous material as defined in claim 1 wherein x has a value of from about 4 to about 9.

3. The multi-filament polyester fibrous material as defined in claim 2 wherein R represents the residue of a polyhydric alcohol.

4. The multi-filament polyester fibrous material as defined in claim 2 wherein said finish additionally comprises a polyester fiber lubricant.

5. The multi-filament polyester fibrous material as defined in claim 1 wherein said finish additionally comprises a polymerization catalyst.

6. The multi-filament polyester fibrous material of claim 1 wherein said finish is applied to said polyester fibrous material during the spinning thereof.

7. The multi-filament polyester fibrous material as defined in claim 1 wherein said finish additionally comprises a crosslinking agent.

8. The multi-filament polyester fibrous material as defined in claim 7 wherein crosslinking agent comprises an aminoplast.

9. The multi-filament polyester fibrous material as defined in claim 8 wherein said active ingredient is present in said finish in an amount of between about 5 to about 50 weight percent.

10. The multi-filament polyester fibrous material as defined in claim 1 wherein said finish additionally comprises an oily lubricant vehicle and wherein said active ingredient is dissolved in said vehicle.

11. The multi-filament polyester fibrous material as defined in claim 10 wherein said finish additionally comprises a polymerization catalyst.

* * * * *